United States Patent [19]

McCree

[11] Patent Number: 5,106,566
[45] Date of Patent: Apr. 21, 1992

[54] FORMING A RECLOSABLE CLOSURE FOR A THERMOPLASTIC CONTAINER

[75] Inventor: John McCree, Saginaw, Mich.
[73] Assignee: DowBrands Inc., Indianapolis, Ind.
[21] Appl. No.: 587,818
[22] Filed: Sep. 24, 1990

Related U.S. Application Data

[62] Division of Ser. No. 265,027, Oct. 31, 1988, abandoned.

[51] Int. Cl.[5] .............................................. B29C 55/30
[52] U.S. Cl. ............................... 264/280; 264/177.17; 264/177.19; 264/320; 264/322; 264/323
[58] Field of Search ............... 264/320, 177.1, 210.1, 264/280, 285, 322, 323, 177.19, 177.17, 209.4; 156/66

[56] References Cited

U.S. PATENT DOCUMENTS

| | | | |
|---|---|---|---|
| Re. 32,254 | 9/1986 | Daws et al. ................. | 425/393 |
| 2,194,313 | 3/1940 | Loomis ......................... | 264/323 |
| 2,249,004 | 7/1941 | Kahn et al. ................... | 264/323 |
| 2,294,555 | 9/1942 | Hendrie ....................... | 264/210.1 |
| 2,952,037 | 9/1960 | Ruck et al. .................. | 18/47.5 |
| 3,340,116 | 9/1967 | Naito ............................ | 156/92 |
| 3,462,332 | 8/1969 | Goto ............................. | 40/12 |
| 3,538,210 | 11/1970 | Gatto ........................... | 264/209.4 |
| 3,849,286 | 11/1974 | Brandt et al. ................ | 264/209.4 |
| 3,886,250 | 5/1975 | Danko .......................... | 264/177 R |
| 3,945,872 | 3/1976 | Noguchi ....................... | 156/244 |
| 4,663,107 | 5/1987 | Takada et al. ............... | 264/209.4 |
| 4,676,851 | 6/1987 | Scheibner et al. ........... | 156/66 |
| 4,859,259 | 8/1989 | Scheibner .................... | 156/66 |

FOREIGN PATENT DOCUMENTS

| | | | |
|---|---|---|---|
| 3241005 | 11/1982 | Fed. Rep. of Germany ... | 264/209.4 |
| 62-152732 | 7/1987 | Japan ............................ | 264/177.19 |

Primary Examiner—Jan H. Silbaugh
Assistant Examiner—Brian J. Eastley

[57] ABSTRACT

A process for forming a reclosable closure profile, wherein the configuration of the closure profile is mechanically altered and, while mechanically confined, is simultaneously cooled.

3 Claims, 1 Drawing Sheet

1

FORMING A RECLOSABLE CLOSURE FOR A THERMOPLASTIC CONTAINER

This is a divisional of application Ser. No. 265,027, filed Oct. 31, 1988, now abandoned.

FIELD OF THE INVENTION

This invention relates to plastic containers having interlocking reclosable closure profiles, and more particularly, to a method and apparatus for controlling the configuration and certain critical dimensions of the interlocking closure profiles, such that mated closure profiles tightly interlock together.

BACKGROUND OF THE INVENTION

A typical plastic container having interlocking closure profiles may be produced from a thermoplastic polymeric sheet having interlocking closure profiles on its surface. The sheet, having integral closure profiles thereon, may be used to manufacture bags or other containers which are closable by interlocking one closure profile with another mating profile. Such profiles are commonly designed to be reclosable once opened. Generally, one of the closure profiles, usually designated as the head member or male profile, is arrow-head shaped having an enlarged head portion and a stem portion which attaches the head portion to the polymeric sheet. The mating closure profile is commonly designated as the groove member or female profile, and basically comprises spaced-apart upstanding arm portions attached to the polymeric sheet, generally by a somewhat thicker stem, and which together define a gap into which the aforementioned head portion is received The distal areas of the arm portions normally hook inwardly to firmly lock the head portion therebetween. Thermoplastic polymeric materials from which the sheet and closure devices are generally made are polyethylene, polypropylene, nylon and other thermoplastic material which may be formed by extrusion.

The closure profile elements may be separately manufactured as strips and thereafter attached to the polymeric sheet by appropriate means, such as for example by heat sealing the closure profile element strips and sheet together, or by hot melt adhesives, or the like. Such a process is disclosed in U.S. Pat. No. 3,462,332. Alternatively, the closure profile elements and sheet may be extruded as an integral unit from a single die, or by extruding the closure profile elements from dies angularly disposed towards a cast sheet, whereupon the closure profile elements and sheet fuse to form an integral plastic container stock material. See, for example, U.S. Pat. No. 3,340,116.

The width of the gap in the groove member of the closure profile is crucial to the proper functioning and accurate mating of the groove and head members. Where the gap is too wide, for example, the closure profiles separate too easily. Where the gap is too narrow, the closure profiles are difficult to mate together, both during manufacture of the plastic containers and later by the end user of the final product.

Present manufacturing practices have heretofore relied principally on strategically cooling the polymeric sheet, or the closure profiles, or both, to attain and maintain consistent gap width control. Generally, streams of gaseous or liquid coolant are directed onto the surfaces of the closure profiles to fix their final configurations, as in U.S. Pat. No. 3,945,872. Such a process, however, can have control problems. At varying container stock production rates and conditions, the liquid coolant pressure, temperature and direction of application must be modified by trial and error in order to finally attain the proper parameters for precise control of the groove member closure profile gap width.

A similar method of gap width control is disclosed in U.S. Pat. No. 4,676,851, wherein the shape of the closure profile elements is stabilized by directing a liquid coolant onto the surfaces of the closure profile elements by means of primary cooling nozzles. Secondary cooling nozzle assemblies, having coolant confining regions, are also disclosed; however, the shape of the closure profile elements is established prior to their entry into these secondary cooling nozzle assemblies. As in the previously referenced patent, the configuration of the closure profiles is determined by the temperature, direction of application, and force of a liquid coolant impinging upon the surfaces of the closure profiles, and not by contact between the closure profiles and the secondary cooling nozzle assemblies. A primary factor which affects the gap width is the container stock manufacturing rate, which must be coordinated with the liquid coolant application to optimize the final gap width. Clearly, changes in manufacturing speed will dictate necessary modifications in liquid coolant flow rate, temperature, pressure and angle of application It is, therefore, an object of the present invention to provide a method and apparatus for accurately controlling the critical dimensions of a closure profile, during the manufacture of plastic container stock material at varying production rates, by mechanically altering then confining the closure profile to establish its desired configuration, while simultaneously reducing its temperature below that at which an applied stress will cause permanent deformation. In another embodiment of the present invention, the closure profile is mechanically altered then confined, and simultaneously only partially cooled such that when the confining means are removed therefrom, the elastic forces within the closure profile will cause it to partially recover its original configuration, resulting in the desired closure profile shape, after which the closure profile configuration is fixed by reducing the closure profile temperature below its plastic set temperature.

SUMMARY OF THE INVENTION

Accordant with the present invention, it has surprisingly been discovered that certain critical dimensions of an interlocking closure profile, such as the width of the gap in the groove member, can be precisely controlled by passing the closure profile, while still hot enough to be formed, through configuration altering and profile confining means, whereby the surfaces of the closure profile contact the altering and confining means, thereby establishing the desired final configuration, and by simultaneously cooling the confined closure profile to a temperature below its plastic set temperature by directing a controlled flow of a cooling fluid onto the closure profile. In another embodiment of the present invention, the configuration altering and profile confining means do not establish the final closure profile configuration, but instead pre-form the closure profile such that when the altering and confining means are removed, the combined effect of passage through the altering and confining means, partial cooling, and the partial recovery of the closure profile toward its original configuration due to the elastic forces within, will result in the desired closure profile configuration. Either embodiment of the present invention may be practiced at any point in the manufacturing process following the extrusion of the closure profile: e.g., closure profile configuration may be altered for closure profile strips prior to attachment to a polymeric sheet, or closure profile configuration may be altered for closure profiles which are already an integral part of a plastic container stock material, etc.

Precise control and accurate dimensions may be achieved through the use of an apparatus comprising a base member presenting a generally channel shaped inner surface adapted to receive the closure profile, said inner surface having spaced-apart sidewalls for contacting, altering and confining the closure profile, said inner surface additionally having multiple apertures through which a cooling fluid may pass to contact and cool the closure profile. The configuration of the formable thermoplastic closure profile is fixed by passage between the sidewalls and by contact with a cooling fluid such that the temperature of the closure profile is reduced below its plastic set temperature prior to exiting from between the sidewalls. In another embodiment of the present invention, the closure profile is only partially cooled while passing between the sidewalls, and upon exiting from the channel partially recovers toward its original configuration due to elastic forces within, thereby establishing the desired final configuration which is ultimately fixed by further cooling of the closure profile to a temperature below its plastic set temperature.

The aforementioned apparatus and method of use may be employed in the manufacture of plastic container stock material, from which resealable plastic bags or resealable rigid containers may be manufactured.

BREIF DESCRIPTION OF THE DRAWINGS

DETAILED DESCRIPTION OF THE DRAWINGS

Figure 1:
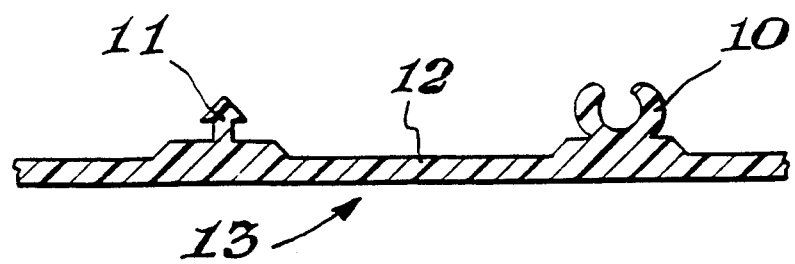
FIG. 1 is a cross-sectional view taken through a thermoplastic polymeric film, illustrating head and groove interlocking closure fastening devices thereon.

FIG. 1 illustrates a typical set of closure profiles 10 (groove or female member) and 11 (head or male member), which in combination with a thermoplastic polymeric sheet 12, comprise the integral plastic container stock material 13. It is to be understood that the thermoplastic polymeric sheet 12 may contain more than one of each kind of closure profile 10 and 11, depending on the processes used for the subsequent manufacturing of plastic containers from the stock material. As initially extruded, whether as a composite or integral extrusion, the groove member closure profile 10 portion of the plastic container stock material 13 has a preliminary configuration, having dimensions differing from the ultimately desired shape of the finished closure profile. In one embodiment of the present invention, the groove member closure profile 10, while it retains sufficient heat from the extrusion process to be formed, is passed through the apparatus 20 of this invention and simultaneously cooled below its plastic set temperature, in order to fix the final desired configuration of the closure profile. In another embodiment, the closure profile 10 is passed through the apparatus 20 of this invention and only partially cooled, and upon exiting from the channel 22 partially recovers toward its original configuration due to elastic forces within, thereby establishing the desired final configuration which is ultimately fixed by further cooling using conventional cooling means such as air or water jets (not shown). By fixing is meant the establishing of a final configuration for a particular thermoplastic closure profile by causing it, while still hot enough to be formed, to assume its final desired shape, and thereafter cooling it to a temperature below which applied stress will not cause permanent deformation; designated hereby as its plastic set temperature.

Figure 2:
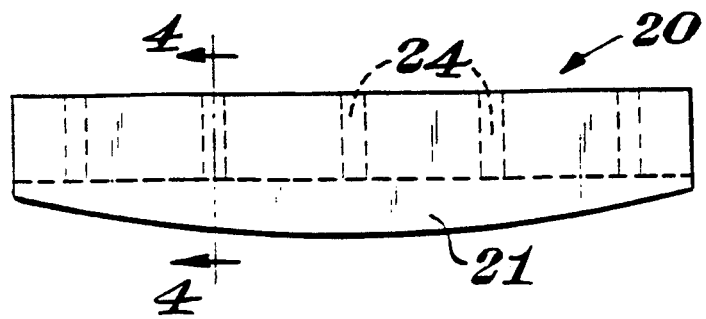
FIG. 2 is a side elevational view of the closure profile altering and confining apparatus of this invention.
Figure 3:
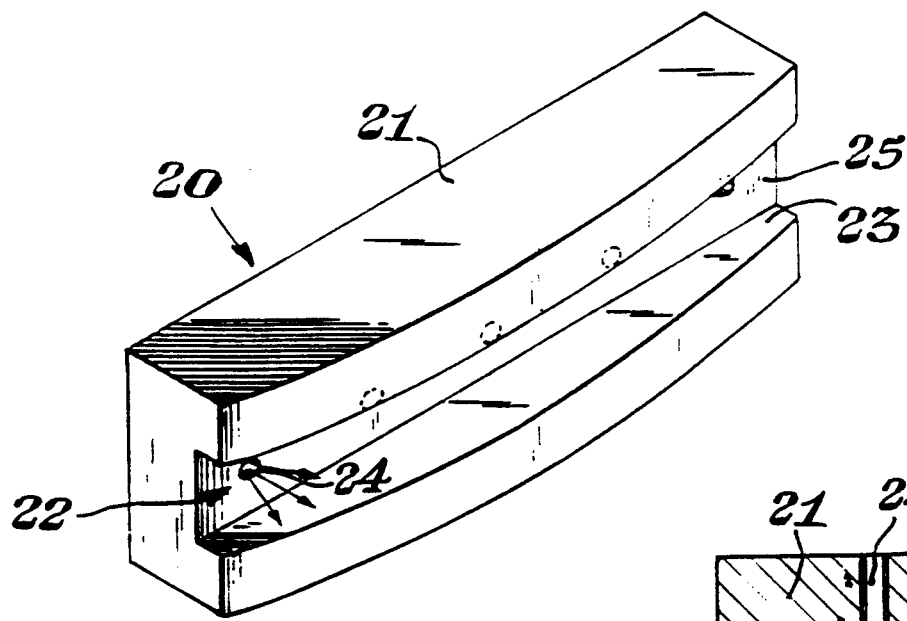
FIG. 3 is a perspective view of the apparatus of this invention, illustrating the channel shaped inner surface, and multiple apertures through which a cooling fluid may pass.
Figure 4:
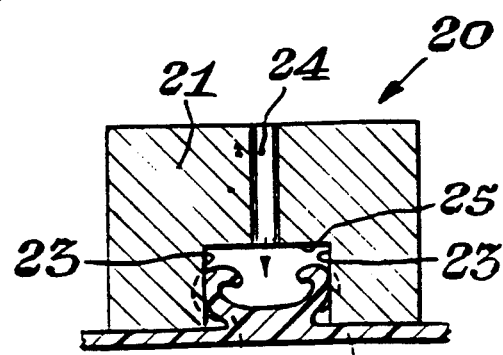
FIG. 4 is an enlarged cross-sectional view taken along line 4—4 of FIG. 2, illustrating the contact between a groove member closure profile and the channel shaped inner surface sidewalls of the apparatus of the present invention, which contact occurs during the use of the apparatus.

Apparatus 20, illustrated in side elevational view FIG. 2 and perspective view FIG. 3, comprises a base member 21, presenting a generally channel shaped inner surface defined by height portion 25 and spaced-apart sidewalls 23, one of which is visible in FIG. 3. The channel shaped inner surface defines a structural feature of the present invention which is hereinafter simply referred to as the channel 22. Channel 22 additionally has multiple apertures 24 through which a cooling fluid, such as air or water, may pass. Channel 22 is designed to accommodate passage therethrough of the groove member closure profile 10, and simultaneously therewith to provide contact between the arm portions of the groove member closure profile 10 and the sidewalls 23 of the channel, as depicted in FIG. 4. The sidewalls 22 alter and confine, by mechanically contacting, the arm portions of the groove member closure profile 10. The apertures 24 allow a controlled stream of cooling fluid to be directed onto the groove member closure profile 10, so as to cool the closure profile. Each apparatus 20 is designed with a channel 22 for a particular sized profile. While channel 22 is shown fixed, the apparatus 20 may be designed with adjustable means (not shown) whereby the dimensions of channel 22 can be varied without replacing apparatus 20 each time a different profile configuration is used.

During the operation of the apparatus of this invention, the groove member closure profile 10, while still containing enough residual heat from the extrusion process to be formed, enters one end of the channel 22 where the arm portions of the closure profile 10 contact the sidewalls 23 of the channel, thereby altering the as-extruded configuration of the closure profile. In one embodiment of the invention, the arm portions of the closure profile 10 are confined by the sidewalls 23, thereby establishing the desired final configuration. Simultaneously, a cooling fluid such as water or air is directed from the apertures 24 onto the closure profile 10, thereby fixing its final configuration prior to exiting from the channel 22. In another embodiment of the invention, the arm portions of the closure profile 10 are confined by the sidewalls 23, and pre-formed to a configuration other than the desired final configuration. Simultaneously, a cooling fluid such as water or air is directed from the apertures 24 onto the closure profile 10, thereby partially cooling the closure profile prior to exiting from the channel 22. As the closure profile 10 exits the channel 22, elastic forces within the closure profile 10 cause it to partially recover toward its original configuration, thereby establishing the desired final configuration. The configuration of the closure profile 10 is thereafter fixed by further cooling using conventional cooling means such as air or water jets (not shown). The cooling fluid in either embodiment may additionally provide lubrication for the closure profile 10 as it contacts the sidewalls 23 of the channel 22 during its passage therethrough; however, lubricating action is not essential to the operation of the apparatus of this invention. Generally, the operation of initially forming a closure profile, and thereafter passing it through the apparatus of the present invention, is a continuous process.

FIG. 4 is an enlarged transverse sectional view taken along line 4—4 of FIG. 2, illustrating the contact between the arm portions of the groove member closure profile 10 and the sidewalls 23 of the channel 22. Also shown is an aperture 24 from which a cooling fluid is directed onto the closure profile 10. Cooling fluids useful for the practice of the present invention are water, brine, liquified gases, air, and the like.

While certain representative embodiments and details have been shown for purposes of illustrating the present invention, it will be apparent to those ordinarily skilled in the art that various changes in applications can be made therein, and that the invention may be practiced otherwise than as specifically illustrated and described without departing from its spirit and scope. For example, the sidewalls of the leading end of the channel may be tapered from wide to narrow, to provide ease of entry of the continuously moving closure profile into the channel, or the channel sidewalls may be contoured to impart a particular shape to the finished closure profile.

What is claimed is:

1. A method of altering and fixing the configuration of a hot, formable thermoplastic female closure profile, said closure profile having a gap comprising mechanically altering the configuration of the closure profile by passing the closure profile, while still hot enough to be formed through a channel having an inner surface defined by spaced-apart sidewalls and a floor, while confining said profile in said channel, said sidewalls contacting surfaces of second profile and simultaneously cooling said profile in its confined configuration by directing a controlled flow of a cooling fluid from multiple apertures extending through the floor in said channel, whereby the width of said gap is controlled and the configuration of said profile is fixed.

2. The method of claim 1, wherein the cooling fluid employed is water.

3. The method of claim 1, wherein said cooling reduces the temperature of the closure profile below its plastic set temperature thereby fixing the configuration of the closure profile.

* * * * *

UNITED STATES PATENT AND TRADEMARK OFFICE
CERTIFICATE OF CORRECTION

PATENT NO. : 5,106,566
DATED : April 21, 1992
INVENTOR(S) : John McCree

It is certified that error appears in the above-identified patent and that said Letters Patent is hereby corrected as shown below:

Column 6, Line 14, "formed through" should read --formed, through--;
Line 17, "second" should read --said--.

Signed and Sealed this

Twenty-fourth Day of August, 1993

Attest:

BRUCE LEHMAN

Attesting Officer     Commissioner of Patents and Trademarks